(12) United States Patent
Reich et al.

(10) Patent No.: US 10,732,061 B2
(45) Date of Patent: Aug. 4, 2020

(54) UNIBODY FLEXURE DESIGN FOR DISPLACEMENT-BASED FORCE/TORQUE SENSING

(71) Applicant: X Development LLC, Mountain View, CA (US)

(72) Inventors: Adam Reich, Oakland, CA (US); Stephen Dorow, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 82 days.

(21) Appl. No.: 15/698,511

(22) Filed: Sep. 7, 2017

(65) Prior Publication Data
US 2019/0072443 A1    Mar. 7, 2019

(51) Int. Cl.
*G01L 3/08*    (2006.01)

(52) U.S. Cl.
CPC ...................... *G01L 3/08* (2013.01)

(58) Field of Classification Search
CPC .................. G01L 3/08; G01N 33/24
See application file for complete search history.

(56) References Cited

U.S. PATENT DOCUMENTS

| 4,099,409 | A | | 7/1978 | Edmond |
| 4,704,909 | A | * | 11/1987 | Grahn ................ G01L 1/24 73/862.043 |
| 4,823,618 | A | | 4/1989 | Ramming |
| 5,648,617 | A | | 7/1997 | Cullen |
| 6,253,626 | B1 | | 7/2001 | Shoberg et al. |
| 6,269,702 | B1 | | 8/2001 | Lambson |
| 6,804,012 | B2 | | 10/2004 | Gombert |
| 6,871,552 | B2 | | 3/2005 | Liu et al. |
| 7,121,147 | B2 | | 10/2006 | Okada |
| 7,360,456 | B2 | | 4/2008 | Morimoto |
| 8,063,883 | B2 | | 11/2011 | Senft |
| 8,161,827 | B2 | | 4/2012 | Kato et al. |
| 8,726,741 | B2 | | 5/2014 | Krippner |
| 8,776,616 | B2 | | 7/2014 | Szasz et al. |
| 8,943,902 | B2 | | 2/2015 | Bosscher et al. |
| 8,965,577 | B2 | | 2/2015 | Arimitsu |

(Continued)

FOREIGN PATENT DOCUMENTS

| EP | 1843243 | 10/2007 |
| WO | 2018065765 | 4/2018 |

OTHER PUBLICATIONS

Capacitive F/T Transducer Model 200, Low-Cost Six Axis Force/Torque Sensor Data Sheet, ATI Industrial Automation, http://www.ati-ia.com/Library/documents/Capacitive%20FT200.pdf.

(Continued)

*Primary Examiner* — Jamel E Williams
(74) *Attorney, Agent, or Firm* — McDonnell Boehnen Hulbert & Berghoff LLP

(57) ABSTRACT

An example device includes an inner element, an outer surrounding element, and a plurality of connecting flexural elements coupled between the inner element and the outer surrounding element. The inner element has a plurality of reflective surface areas that are configured to reflect light to a sensor. The outer surrounding element surrounds the inner element. The plurality of connecting flexural elements allow the inner element to move relative to the outer surrounding element.

20 Claims, 7 Drawing Sheets

(56) References Cited

U.S. PATENT DOCUMENTS

| | | | |
|---|---|---|---|
| 9,038,484 B2* | 5/2015 | Seibold | G01L 5/161 |
| | | | 73/862.045 |
| 9,366,587 B2 | 6/2016 | Nagura | |
| 10,048,145 B2 | 8/2018 | Janik | |
| 2004/0129899 A1 | 7/2004 | Gombert | |
| 2005/0185196 A1 | 8/2005 | Kitamura | |
| 2008/0094632 A1* | 4/2008 | Harsh | G01J 3/02 |
| | | | 356/436 |
| 2010/0253650 A1 | 10/2010 | Dietzel | |
| 2011/0107850 A1 | 5/2011 | Kim | |
| 2013/0265233 A1 | 10/2013 | Obermeyer | |
| 2014/0174239 A1 | 6/2014 | Nagata | |
| 2014/0238153 A1 | 8/2014 | Wood et al. | |
| 2015/0177082 A1* | 6/2015 | Sawada | B25J 9/1697 |
| | | | 356/32 |
| 2016/0252410 A1 | 9/2016 | Teshigawara | |
| 2017/0211999 A1* | 7/2017 | Bradford | B25J 13/085 |
| 2017/0363464 A1 | 12/2017 | Shafer | |
| 2018/0120181 A1 | 5/2018 | Kamiya | |

OTHER PUBLICATIONS

HEX-58-RE-400N 6-Axis Force Sensor Data Sheet, OptoForce, http://optoforce.com/wp-content/uploads/2014/03/HEX-58-RE-400N-Datasheet-1.41.pdf.

HEX-70-CE-2000N 6-Axis F/T Sensor Data Sheet, OptoForce, http://optoforce.com/wp-content/uploads/2014/03/HEX-70-CE-2000N-Datasheet-1.41.pdf.

HEX-70-CG-1000N 6-Axis F/T Sensor Data Sheet, OptoForce, http://optoforce.com/wp-content/uploads/2014/03/HEX-70-CG-1000N-Datasheet-1.41.pdf.

HEX-70-CH-4000N 6-Axis F/T Sensor Data Sheet, OptoForce, http://optoforce.com/wp-content/uploads/2016/09/HEX-70-CH-4000N-Datasheet-1.5.pdf.

HEX-70-XE 6-Axis F/T Sensor Data Sheet, OptoForce, http://optoforce.com/wp-content/uploads/2014/03/HEX-70-XE-Datasheet.pdf.

HEX-70-XG 6-Axis F/T Sensor Data Sheet, OptoForce, http://pdf.directindustry.com/pdf/optoforce-ltd/hex-7-0-x-g/125451-667819.html.

FT 150 Force Torque Sensor, RobotIQ, http://robotiq.com/wp-content/uploads/2014/09/Robotiq-Force-Torque-Sensor-FT-150-Specifications.pdf.

6-Axis Force / Moment Sensor FT, Schunk, https://us.schunk.com/fileadmin/pim/docs/IM0018179.PDF.

FT 300 Force Torque Sensor, RobotIQ, http://robotiq.com/wp-content/uploads/2016/01/specsheet-FT300-Final-web.pdf.

Caroline Jacq, Barthelemy Luthi, Thomas Maeder, Olivier Lambercy, Roger Gassert, Peter Ryser, Thick-film multi-DOF Force / torque sensor for wrist rehabilitation, Aug. 2010, Sensors and Actuators A, vol. 162, num. 2, p. 361-366, published by Elsevier.

Schunk FTC-050 Force Sensor Data sheet, available at least as of Dec. 9, 2008.

Written Opinion of the ISA for PCT/US2018/043864, dated Nov. 1, 2018.

* cited by examiner

UNIBODY FLEXURE DESIGN FOR DISPLACEMENT-BASED FORCE/TORQUE SENSING

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems that can operate alongside and interface with humans becomes apparent. Therefore, a demand for such robotic systems has helped open a field of innovation in actuators, sensing techniques, controllers, as well as component design and assembly.

SUMMARY

The present application discloses implementations that relate to devices, systems and methods that may include a flexure assembly device as part of a force/torque sensing system. The flexure assembly may include a unibody flexure device. The force/torque sensing system may be included as part of a robotic system, such as a robotic arm. Flexure devices described herein may include an inner element, an outer surrounding element, and a plurality of connecting flexural elements. Within examples, the inner element may be a disk element and the outer surrounding element may be a ring element that surrounds or at least partially encompasses the disk element. Moreover, the inner element may be an inner flexural element and the outer surrounding element may be an outer flexural element. The inner element, the outer surrounding element, and the plurality of connecting flexural elements may be injection molded and form a single flexure device.

In some implementations, the inner element may be connected to one component of a robotic arm (or other system) and the outer surrounding element may be connected to another component of the robotic arm. The connecting flexural elements may provide a known resistance to the movement of the inner element relative to the outer surrounding element such that deflections between the inner element and outer surrounding element caused by an external load on the device or system may be determined. Within examples, the force/torque sensing system may determine at least one component of the forces and moments of a load applied on the robotic arm based on the measured deflection.

In at least one embodiment, a device is described. The device includes an inner element, an outer surrounding element, and a plurality of connecting flexural elements. The inner element includes a plurality of reflective surfaces that are configured to reflect light to a sensor. Moreover, the outer surrounding element surrounds the inner element. The plurality of connecting flexural elements are configured to allow the inner element to move relative to the outer surrounding element.

In another embodiment, a method is described. The method includes injection molding an inner element, an outer surrounding element, and a plurality of connection flexural elements. Within examples, the method includes injection molding an inner element, an outer surrounding element, and a plurality of connection flexural elements into a single unibody flexure device. The inner element includes a plurality of first connection points as well as a plurality of reflective surfaces. Furthermore, the outer surrounding element includes a plurality of second connection points. Moreover, the plurality of connecting flexural elements are coupled between the inner element and the outer surrounding element such that the plurality of connecting flexural elements are configured to allow the inner element to move relative to the outer surrounding element. Additionally, the method includes applying a reflective coating to each of the plurality of reflective surface areas. The method further includes coupling a printed circuit board ("PCB) to the outer surrounding element. The PCB includes a plurality of light-emitting diodes ("LEDs") and a sensor that are positioned opposite the plurality of reflective surface areas of the inner element. The method also includes coupling a first adapter component coupled to the plurality of first connection points of the inner element as well as coupling a second adapter component to the plurality of second connection points of the outer surrounding element.

In yet another embodiment, a system is described. The system includes an inner element, an outer surrounding element, a plurality of connecting flexural elements, and a control system. The inner element includes a plurality of reflective surface areas that are configured to reflect light to a sensor. Moreover, the outer surrounding element surrounds the inner element. The plurality of connecting flexural elements are configured to allow the inner element to move relative to the outer surrounding element. Furthermore, the control system is configured to receive reflected light data from the sensor. Based on the reflected light data, the control system is further configured to determine a deflection of the inner element relative to the outer surrounding element when a load is applied on at least one of the inner element or the outer surrounding element. Additionally, the control system is configured to determine one or more output parameters of the applied load on the system based on the determined deflection.

In yet another aspect, another system is described. The system includes means for injection molding an inner element, an outer surrounding element, and a plurality of connection flexural elements. The inner element includes a plurality of first connection points as well as a plurality of reflective surfaces. Furthermore, the outer surrounding element includes a plurality of second connection points. Moreover, the plurality of connecting flexural elements are coupled between the inner element and the outer surrounding element such that the plurality of connecting flexural elements are configured to allow the inner element to move relative to the outer surrounding element. Additionally, the system includes means for applying a reflective coating to each of the plurality of reflective surface areas. The system further includes means for coupling a printed circuit board ("PCB) to the outer surrounding element. The PCB includes a plurality of light-emitting diodes ("LEDs") and a sensor that are positioned opposite the plurality of reflective surface areas of the inner element. The system also includes means for coupling a first adapter component coupled to the plurality of first connection points of the inner element as well as coupling a second adapter component to the plurality of second connection points of the outer surrounding element.

These as well as other aspects, advantages, and alternatives will become apparent to those of ordinary skill in the art by reading the following detailed description, with reference where appropriate to the accompanying drawings.

DETAILED DESCRIPTION

Figure 1:
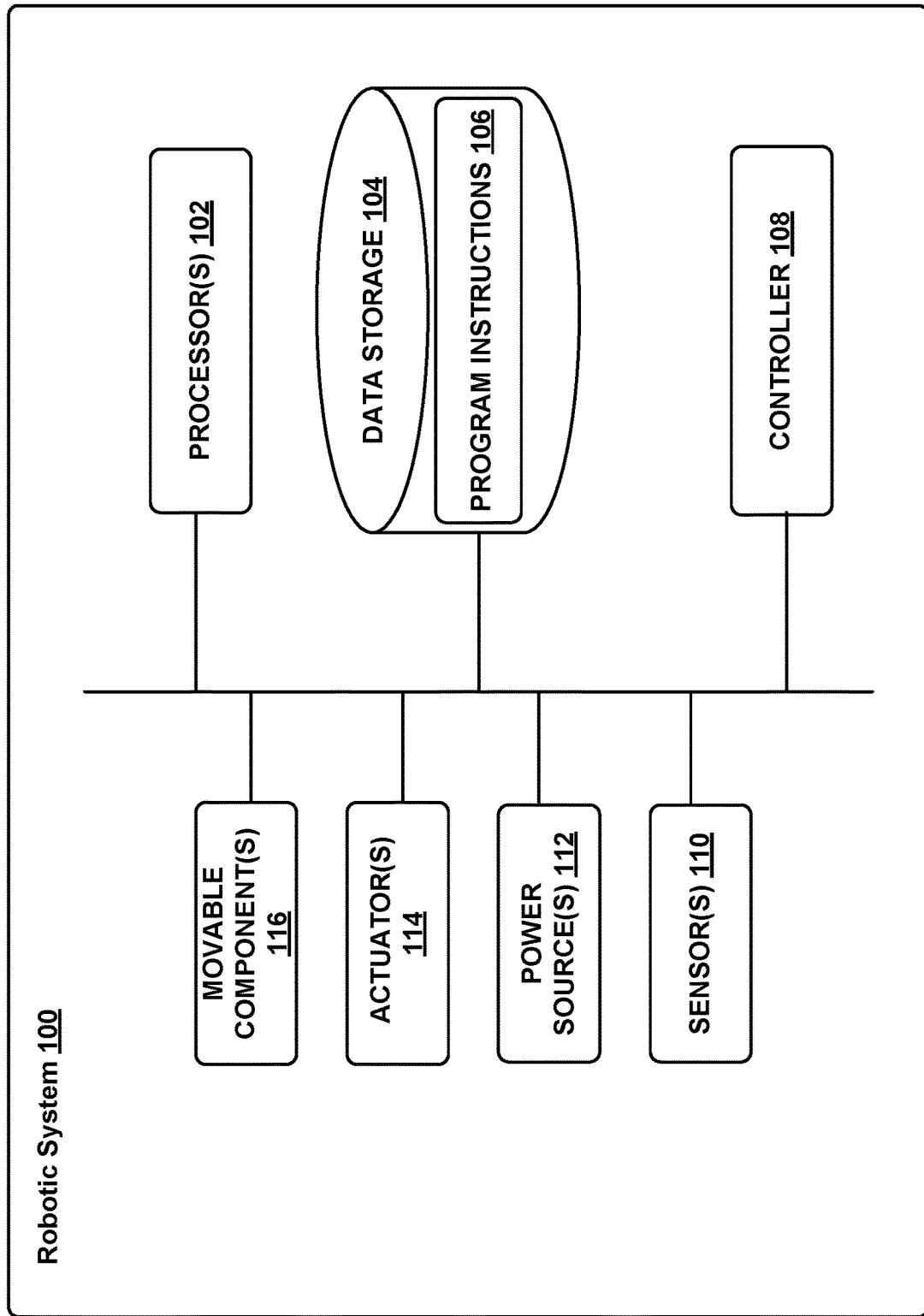
FIG. 1 illustrates an example configuration of a robotic system, according to an example embodiment.

Example devices, systems, and methods are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

Robotics are increasingly being applied to more widespread applications, finding uses in industrial, hospital, home and commercial environments. Force/torque sensing capabilities are a useful resource for enabling implementation of various behaviors which require haptic feedback, and also for providing a safe and compelling user-experience when interfacing with people. An enabling trend in the growing ubiquity of robots is the gradual introduction of lower-cost and more human-safe technologies. Despite this, force/torque sensors available commercially remain quite costly, and consequently are not feasible for integration in very-low cost systems.

Specifically, availability of a six-axis (or six degrees-of-freedom) force/torque sensor at lower prices relative to existing technologies may enable a wide range of applications which do not justify the costs of current force/torque sensing options. In addition to strain gage based sensors (which may be quite costly), there has been a recent emergence of displacement-based sensors using various technologies such as optical and capacitive approaches. The currently available versions of these displacement-based sensors tend to be too large in size for use in small robotic systems, and remain cost-prohibitive for certain applications. Other displacement-based sensors may include various custom machined parts that take significant time and money to manufacture, especially at scale, and may also be difficult and timely to install.

Displacement-based sensors may rely upon the use of a unibody flexure device within a flexure assembly to provide a repeatable relationship between applied load and resultant deflection. The resultant deflection may indicate one or more components of position and/or orientation of components of a flexure assembly. Further, the resultant deflection, or just deflection, may include linear and/or rotational displacement of components of the flexure assembly within a displacement-based sensor. Within examples, the deflection may be considered a relative position between components of the flexure assembly. As the flexure device and assembly are made smaller, the resultant deflection tends to decrease (maintaining a comparable degree of deflection would necessitate design changes which result in higher stresses). For optimal performance of a sensor, it may be desirable that the magnitude of deflections of the sensing elements is roughly equal for each full-scale component load. Furthermore, the deflection provided by the sensor may need to be sufficient to provide the desired measurement resolution as dictated by the sensing technology and application. Thus, as the use of robotic systems continues to grow, the resultant need for relatively high deflection, scalable, low-cost sensing systems that fits within a small footprint poses a unique engineering challenge.

An example unibody flexure device within a flexure assembly may be used as part of a six-axis force/torque sensor (e.g., for a commercial robotic mobile manipulator). A flexure assembly may include an injection molded, unibody flexure device that includes multiple elements that are configured to move relative to one another in six degrees-of-freedom. More specifically, the unibody flexure device may include an inner element and an outer surrounding element that may move relative to one another such that any resulting deflection between the inner element and the outer element may be determined by a sensor, such as a displacement sensor. In some examples, the inner element may be a disk element and may take various shapes such as round, circular, rectangular, or hexagonal, among other possibilities. Similarly, the outer surrounding element may also be round, circular, rectangular, or hexagonal and surround or at least partially surround or encompass the inner element. The outer surrounding element may be considered a loop around the inner element. In at least one example, more than one outer surrounding element may be part of the flexure assembly and may not form a continuous loop around the inner element.

Within examples, a plurality of connecting flexural elements may be coupled between the inner element and the outer surrounding element. The plurality of connecting flexural elements may be structured to allow for movement between the inner element and outer surrounding element. Moreover, the connecting flexural elements may act like spring components in providing a linear resistance relationship. As such, within examples, the connecting flexural elements may be designed to resist a load applied on the flexure assembly beyond a resting zero-load position. In some aspects, the plurality of connecting flexural elements may permit deflection between the inner element and the outer surrounding element when a load is applied to the flexure assembly.

Among other sensors, in some embodiments an optical displacement sensor may be utilized to determine a deflection of the inner element relative to the outer surrounding element. For example, the inner element may include a plurality of reflective surfaces that are configured to reflect light back to a sensing element. The sensing element may be coupled to the outer surrounding element such that the sensing element is configured to move with outer surrounding element relative to the reflective surfaces of the inner element. As such, when a force is applied to at least one of the outer surrounding element or the inner element, characteristics of light reflected from the reflective surfaces back to the sensing element may change. The sensor, sensing element, or a sensing system included as part of a computing or control system may then determine a magnitude of defection based on the change in the reflected light. In other implementations, other known sensing techniques are considered herein. For example, instead of reflective surfaces the inner element (as well as other components) may include capacitive features that may also provide data about the deflection of flexure device components described herein.

As described herein, the unibody flexure device may be injection molded, 3D printed, or otherwise constructed into a single component. By utilizing such manufacturing methods, the flexure device may include only a single unique part that can be rapidly manufactured at relatively low costs and in high volume when compared to other known manufacturing methods. Furthermore, with a unibody flexure device, a flexure assembly described herein may include less parts and components than previously existing designs.

The connecting flexural elements may have a different desirable stiffness depending on the designed use of the force/torque sensor that may include a designed range of load magnitudes the sensor may experience or be configured to measure. The stiffness of the flexural elements may be based on the design (i.e. shape and dimensions) along with the modulus of elasticity of the material chosen for the flexural element. For example, a high modulus of elasticity may be sought when deflection is undesirable, while a low modulus of elasticity is required when flexibility is needed. The shape and dimensions of the connecting flexural elements also affect the overall stiffness of the unibody flexure device. Knowing the stiffness of the flexural elements as well as measuring the deflection of the inner element relative to the outer surrounding element may allow a system to calculate the resultant forces experienced by the overall flexure assembly when a load is applied to the system. Within implementations, a fixed amount of displacement may be preferred and as such a design load resulting in such a displacement may be considered. Nonetheless, if there is a high load application, for example, the overall flexure stiffness may be greater to prevent too much motion, and the opposite (i.e. a low load application, lower stiffness to prevent too little motion) may similarly be considered.

A stiffness matrix, which includes stiffness entries or elements for six degrees-of-freedom, may define or model the overall stiffness of the flexural elements and/or the unibody flexure device. As such, a flexure device design that includes multiple flexural elements with a uniquely designed shape may allow for tuning or control of the stiffness matrix in six degrees-of-freedom. For example, the design may provide the ability to effectively adjust each element of the stiffness matrix, where the elements may include a stiffness along an X-axis, a stiffness along a Y-axis, a stiffness along a Z-axis, a stiffness in bending (or rotation) about the X-axis, a stiffness in bending about the Y-axis and a stiffness in bending about the Z-axis. In one embodiment, tuning the stiffness matrix may include reducing an amount of deflection due to moments about the X-axis and/or the Y-axis, while maintaining deflections from axial forces along the Z-axis. As such, among other possible examples, the connecting flexural elements may have an arch shape with a curved portion and possible straight portions. The arch shape may allow for a single set or a single design of connecting flexural elements that is configured to resist or counteract movement in six degrees-of-freedom (or another desired number of degrees-of-freedom based on design of the system). The connecting flexural elements may also have a certain calculated thickness. By specifically designing the radius of the curve of the arch (for example), an overall height of the flexural elements (a combination of the curve and the straight portions), and the width (or thickness) of the connecting flexural elements the unibody flexure device design may allow for precise tuning of the stiffness matrix of the flexure assembly in six degrees-of-freedom. Tuning of the stiffness matrix may allow for additional control over the magnitude of deflections and movement between the elements of the flexure device as well as components of the overall flexure assembly.

An axial force applied on the unibody flexure may cause linear deflections or displacements of the inner element relative to the outer surrounding element; similarly, a moment applied on the unibody flexure may cause rotation or angular displacement of the inner element relative to the outer surrounding element. Within examples, an axial force may cause combined linear motion and rotation of the inner element relative to the outer surrounding element. In some embodiments, deflections may be measured at fixed points of the inner element, or components coupled to the inner element, relative to points on the outer surrounding element, or components coupled to the outer surrounding element. The points of measurement are not coincident with the center of rotation and that are located a distance away from the center of rotation, such that an induced rotation of the elements relative to one another may result in apparent translation to a sensing element. Thus, the deflection from forces as well as moments may be measured in meters, for example.

Within examples, a six degree-of-freedom force/torque displacement sensor may have design loads and desired deflections based upon the designed applications or environments for the sensor. For example, within an environment, the force/torque sensor may be designed for six degrees-of-freedom, where $F_x$, $F_y$, and $F_z$ represent the component forces in three directions and $M_x$, $M_y$ and $M_z$ represent the components of the moments about each axis. The design loads for each of the force and moment components may be $F_x=F_y=F_z=100$ newtons ("N"), $M_x=M_y=4$ newton-meters ("Nm"), and $M_z=2.5$ Nm. The desired deflections (represented by $d_x$, $d_y$, $d_z$ in each of the three directions) resulting from an applied load may include ranges of deflections. For example, the desired deflections may be 0.03 mm<$d_x$, $d_y$, $d_z$<0.15 mm.

Considering the design loads and range of desired displacements, a design stiffness of the flexural elements may be approximated and a geometry or shape of the flexural elements may then be designed. The design of the flexural elements may be tested and possibly optimized using a range of finite element analysis techniques. For example, with a reasonable linear approximation of the actual behavior of the flexure elements, the design stiffness ("k") may be calculated from the equation:

$$k = \frac{F}{d} \text{ or } k = \frac{M}{d \cdot a}$$

where "F" describes the force(s), "d" describes the displacement(s), "M" describes the moment(s) and "a" describes a moment arm (i.e. distance away from an axis upon which the force is acting). "F," "d" "M," "a" and "k" may also be represented in matrix form and include components in each direction.

While six degrees-of-freedom ("DOF") force/torque displacement sensor system is specifically described herein, the unibody flexure design described herein is also considered for less than six DOF sensing systems as well. Devices, methods, and systems described herein for such six DOF sensors may be modified for applications where six DOF is not necessary. For example, flexure assemblies and devices described herein are also applicable to four DOF sensing systems, among other possibilities.

Within examples, when a load is applied to the unibody flexure device, one or more deflections of the inner element relative to the outer surrounding element (or components attached to either) may be measured by one or more sensors, and by approximating or determining the stiffness coefficient(s) of the flexural element(s), at least one component of the forces and/or moments may be determined using the relationships described above.

Within some examples, deflection may not need to be computed and instead, direct signals from the sensor may be mapped to force magnitudes. For example, raw voltages, frequencies or other output signals or parameters from sensing elements may be measured after applying known loads to the unibody flexure assembly. A model or direct mapping may then be created using the known applied loads and the measured sensor outputs. Utilizing this calibration process to create a direct correlation of sensor output to known loads, unknown forces and/or torques may be determined directly from the sensor output signal(s). Within other examples, outputs from the sensor may be mapped directly to other output parameters such as position or orientation of a robotic system.

The output signals from the sensing elements of the unibody flexural assembly may be dependent on deflections (or displacements) of the flexure device, and the deflections may depend on the loads applied to the flexure assembly. As such, for example, deflections ("d") may be a function of volts ("V," as an example output signal of the sensing elements): $d=f(V)$. Deflection may have a linear, polynomial or other relationship to volts within specific examples. Continuing, an applied load ("F") may be a function of deflection: $F=g(d)$. Similarly, applied loads may have a linear, polynomial or other relationship to deflection within specific examples. Thus, rather than determining both $f(V)$ and $g(d)$, calibration data previously collected and modeled may be used to directly model the resulting force ("R"), $R=h(V)$, where $h(V)=g(f(V))$.

The design of the flexure device and associated, connecting components may provide cost efficiency and space efficiency for placement in the wrist of a robotic device. In further examples, the design may be used by robot accessory manufacturers for applications of low-cost robotic systems in unstructured or changing environments. The design may also be employed in input devices for gaming, or in medical applications for measuring forces applied by a patient during recovery of motor skills and muscular strength following a stroke or other incident, etc.

II. EXAMPLE ROBOTIC SYSTEMS

Referring now to the figures, FIG. 1 shows an example configuration of a robotic system 100. The robotic system 100 may be a robotic arm, a different type of robotic manipulator, or it may have a number of different forms. Additionally, the robotic system 100 may also be referred to as a robotic device, robotic manipulator, or robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only as robotic system 100 may include additional components and/or have one or more components removed without departing from the scope of the invention. Further, note that the various components of robotic system 100 may be connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some embodiments, the data storage 104 can be implemented using a single physical device (e.g., one optical, magnetic, organic or other memory or disc storage unit), while in other embodiments, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as optical sensors, force sensors, proximity sensors, motion sensors, load sensors, position sensors, touch sensors, depth sensors, ultrasonic range sensors, and infrared sensors, among other possibilities. The sensor(s) 110 may provide sensor data to the processor(s) 102 to allow for appropriate interaction of the robotic system 100 with the environment. Additionally, the sensor data may be used in evaluation of various factors for providing feedback as further discussed below. Further, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in the robotic system 100). In other cases, an actuator may be a linear actuator that may be used in systems involving straight line motion.

In either case, actuator(s) 114 may cause movement of various movable component(s) 116 of the robotic system 100. The moveable component(s) 116 may include appendages such as robotic arms, legs, and/or hands, among others.

The moveable component(s) 116 may also include a moveable base, wheels, and/or end effectors, among others.

In some implementations, a computing system (not shown) may be coupled to the robotic system 100 and may be configured to receive input from a user, such as via a graphical user interface. This computing system may be incorporated within the robotic system 100 or may be an external computing system that is capable of (wired or wireless) communication with the robotic system 100. As such, the robotic system 100 may receive information and instructions, such as based on user-input at the graphical user interface and/or based on user-input received via press of buttons (or tactile input) on the robotic system 100, among other possibilities.

Figure 2:
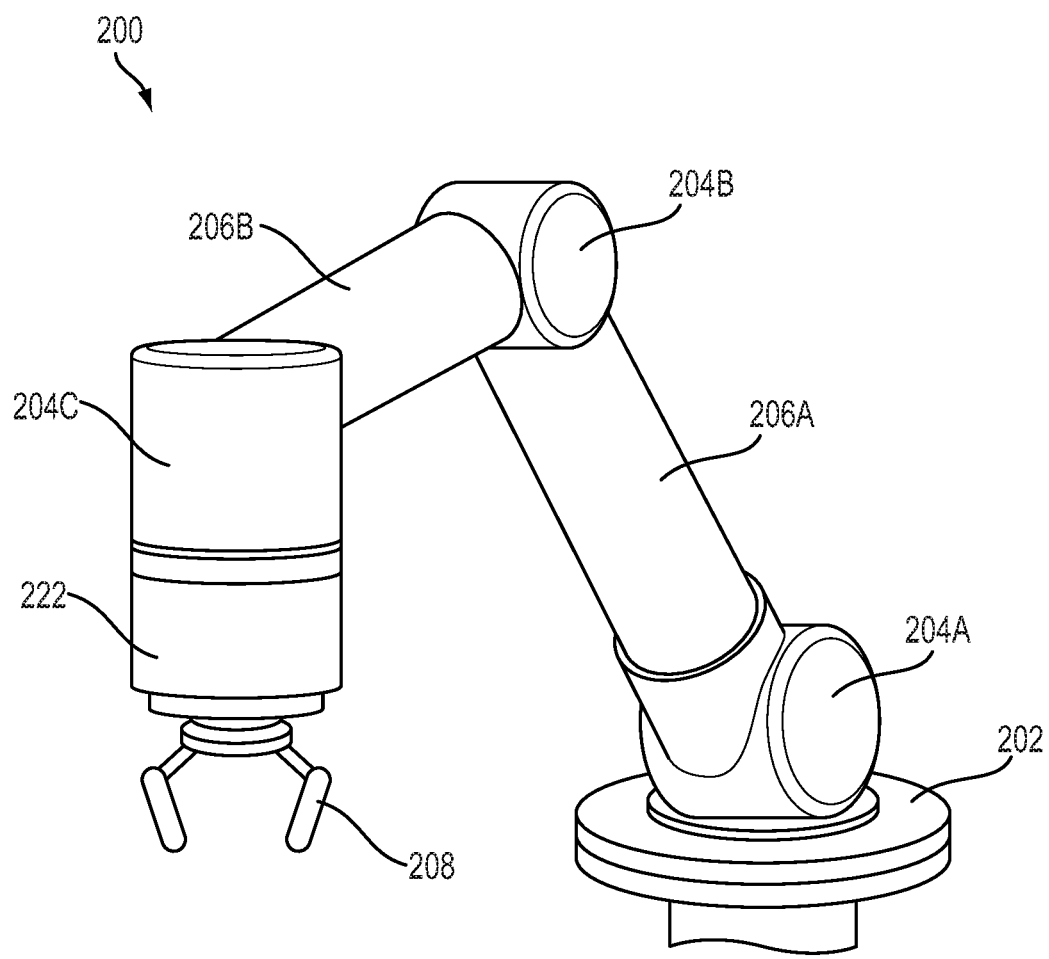
FIG. 2 illustrates an example robotic arm, according to an example embodiment.

A robotic system 100 may take on various forms. To illustrate, FIG. 2 shows an example robotic arm 200. As shown, the robotic arm 200 includes a base 202, which may be a stationary base or may be a movable base. In the case of a movable base, the base 202 may be considered as one of the movable component(s) 116 and may include wheels (not shown), powered by one or more of the actuator(s) 114, which allow for mobility of the entire robotic arm 200.

Additionally, the robotic arm 200 includes joints 204A-204C each coupled to one or more of the actuator(s) 114. The actuators in joints 204A-204C may operate to cause movement of various movable component(s) 116 such as appendages 206A-206B and/or end effector 208. For example, the actuator in joint 204B may cause movement of appendage 206B and the actuator in joint 204C may cause movement of the end effector 208. Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

As illustrated in FIG. 2, the robotic arm 200 may also include a sensor housing 222. The sensor housing 222 is shown between joint 204C and the end effector 208, but may also be located between other components of robotic arm 200. The sensor housing 222 may include sensors, such as sensor(s) 110 from FIG. 1. The sensor housing 222 may also include mechanical and/or electrical components that are configured to receive inputs from other components of the robotic arm 200. In one example, the sensor housing 222 may include a unibody flexure device that may be coupled to other components, such as a sensor assembly configured to measure a deflection caused when a load is applied on some component of the robotic arm 200, such as on the end effector 208. In some implementations, the sensor housing 222 may not include a defined cylindrical outer surface as shown in FIG. 2. For example, the unibody flexure device and a sensor coupled to the flexure device may make-up the entirety of the sensor housing 222, among other possibilities.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the movable component(s) 116, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

III. EXAMPLE UNIBODY FLEXURE DEVICES FOR A FORCE/TORQUE SENSOR

Figure 3:
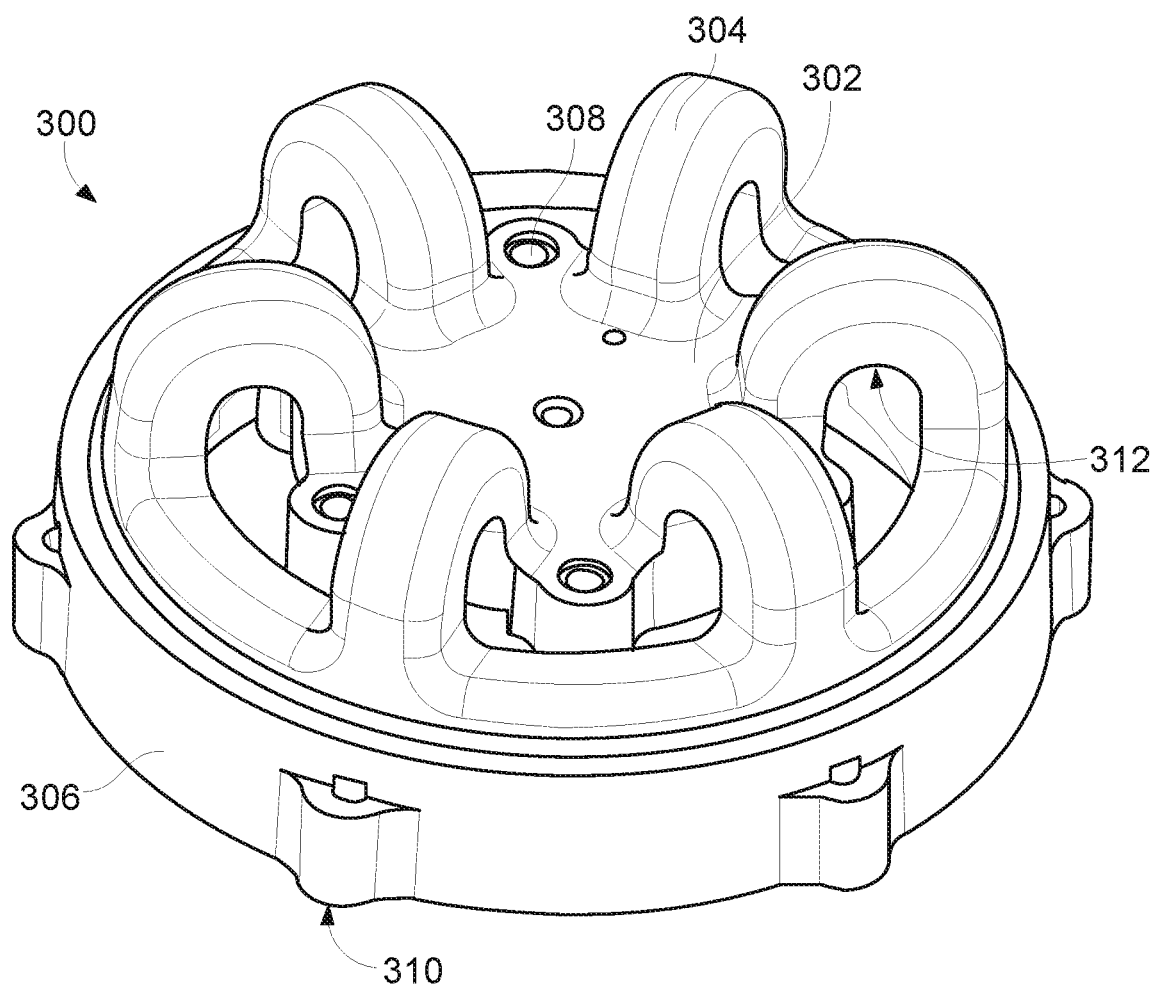
FIG. 3 illustrates an example unibody flexure device, according to an example embodiment.

FIG. 3 is a perspective view of a unibody flexure device 300 ("flexure 300") that may be used as a component of a flexure assembly that may be used as part of a force/torque sensor. In some embodiments, flexure 300 may be connected to additional components not depicted in FIG. 3. For example, the flexure 300 may be located within a sensor housing as part of a robotic system, such as sensor housing 222 and robotic arm 200 of FIG. 2. In some examples, the flexure device 300 may have a height of 25 mm and a 60 mm diameter.

In the embodiment depicted in FIG. 3, the flexure 300 includes an inner disk element 302, a plurality of connecting flexural elements 304, and an outer ring element 306. The inner disk element 302 may be considered an inner element as described in other sections herein. Similarly, the outer ring element 306 may be considered an outer surrounding element as described herein. While the inner disk element 302 may be described and shown in some of the Figures as primarily circular or cylindrical those are simply examples and other shapes are contemplated herein. For example, an inner element may be rectangular or hexagonal in some implementations. Moreover, the outer ring element 306 may also take the form of other shapes than as shown in the Figures. Although depicted in FIG. 3 as a continuous ring or loop, the outer ring element 306 may include multiple components or features that may not be continuous and may be spaced out around the inner element. For example, a plurality of outer surrounding elements that may be considered legs or extensions of the plurality of connecting flexural elements 304 is also contemplated herein.

Within examples, each of a plurality of connecting flexural elements 304 may have a corresponding outer surrounding element that is similar in form and/or function as the outer ring element 306 (and other outer surrounding elements) described herein. For example, a flexure may include six connecting flexural elements and six corresponding outer surrounding elements that may be radially spaced about an inner element such that the outer surrounding elements are coaxial with the inner element. In such an example, each of the outer surrounding elements may include its own connection point.

The inner disk element 302 ("inner disk 302") may include a plurality of first connection points 308 and the outer ring element 306 ("outer ring 306") may include a plurality of second connection points 310. The plurality of first connection points 308 may be in the same plane (e.g., an X-Y plane) as the plurality of second connection points 310 in some examples, while the plurality of first connection points 308 may be a different plane (e.g., an X-Y plane) as the plurality of second connection points 310 in other examples. Within examples, the inner disk 302 may be generally cylindrical in shape, and moreover circular from a top or bottom view (see FIGS. 4A and 4B described below). In further examples, the outer ring 306 may generally be circular in shape and surround the inner disk 302. Moreover, the inner disk 302 may be coaxial with the outer ring 306. In some instances, the inner disk 302 and the outer ring 306 may be centered about a Z-axis, and the Z-axis may run through the middle of the inner disk 302. The outer ring 306 may be considered a ring or a loop that is around in the inner disk 302 within planes parallel to an x-y plane. In other examples, the outer ring 306 may encircle or only surround the inner disk 302 in a radial direction. Further, within examples, the outer ring 306 may have a diameter of 60 mm. A gap or cavity between the inner disk 302 and the outer ring 306 may be designed such that there is enough space to provide for allowable deflection.

The plurality of connecting flexural elements 304 may couple between the inner disk 302 and the outer ring 306. As depicted in FIG. 3, each of the plurality of connecting flexure elements 304 may include an arch 312; as such, each of the plurality of connecting flexure elements 304 may be considered an arch flexural element. While the plurality of connecting flexure elements 304 may have the arch 312 shape in FIG. 3, other shapes of flexural elements are contemplated herein. The shape, thickness, and overall geometrical design of each of the plurality of connecting flexure elements 304 may be based on a stiffness value or characteristic based on the designed loading of the flexure device 300. The plurality of connecting flexural elements 304 may be configured to allow the inner disk 302 to move relative to the outer ring 306.

As depicted in FIG. 3, the arch 312 shape of the plurality of connecting flexure elements 304 may provide the flexure device 300 with physical spring-like characteristics in six degrees-of-freedom. For example, if the inner disk 302 experiences an axial force along the Z-axis (e.g. an applied axial loading), the inner disk 302 may move a relative distance from the outer ring 306 along the Z-axis based (at least partly) on the bending and movement of the each of the plurality of connecting flexure elements 304. At the same time, the arch 312 shape of the same plurality of connecting flexure elements 304 also may allow twisting or a moment about the Z-axis. However, similar to a spring, the shape and overall design of the plurality of connecting flexure elements 304 as part of the flexure device 300 may include the inner disk 302 to be biased towards a resting zero-load position relative to the outer ring 306. The flexure device 300 may be considered to be in the resting zero-load position in FIG. 3. Thus, if the axial force along the Z-axis is removed, the inner disk 302 is configured to move back to the zero-load position relative to the outer ring 306. Additionally, as the inner disk 302 is moved further away from the zero-load position, a return force acting in a direction opposite that of the load applied on the inner disk 302 may increase, thus increasing the bias towards the zero-load position. As such, within examples, the plurality of connecting flexural elements 304 may also resist the relative movement between the inner disk 302 and outer ring 306.

The plurality of connecting flexural elements 304 may be designed to allow the inner disk 302 and the outer ring 306 to move in six degrees-of-freedom relative to one another. While the above example is given as an axial force acting parallel to the Z-axis, other forces in various components of the six degrees-of-freedom are contemplated and the flexure device 300 would operate similarly to as described. Similarly, while the example axial force was applied to the inner disk 302, the axial force may be applied to a component coupled to the inner disk 302, the axial force may be applied to the outer ring 306, or the axial force may be applied to a component coupled to the outer ring 306, among other possibilities. The concept described in the example above, and further examples below, remains the same for all relative movement between the inner disk 302 and the outer ring 306.

For example, a load may be applied to at least one of the inner disk 302 or the outer ring 306 and the load may cause the plurality of connecting flexural elements 304 to deflect. The load may include axial and/or radial components, exposing the flexure device 300 to various forces and/or moments. Axial components of the load may cause tension or compression along an axis that may be parallel to a Z-axis, as well as moments about an X-axis or a Y-axis that may both be perpendicular to the Z-axis and also perpendicular to each other. Radial components of the load may cause forces along the X-axis or the Y-axis, as well as moments about the Z-axis. Furthermore, radial components of the load that are offset along the Z-axis may cause moments about the X-axis and/or Y-axis.

As illustrated in FIG. 3, the plurality of connecting flexural elements 304 may be symmetrically spaced about the flexure device 300. While FIG. 3 illustrates six connecting flexural elements 304, more or less than six flexural elements 304 are considered herein. In other examples, the connecting flexural elements 304 may not be symmetrically spaced about the flexure device 300. For example, if a specific loading scenario with specific forces are designed to be applied on the flexure device 300, additionally flexural elements 304 may be considered in asymmetrical locations to specifically account for the specific loading scenario. In other related examples, instead of additional flexural elements 304, some flexural elements 304 may have a certain stiffnesses designed for loads with specific force components while other flexural elements 304 may have a different stiffness.

Within examples, the flexure device 300 may couple to components of a robotic system, such as a robotic arm, end effector, gripper or other possible components. For example, a component of a robotic arm (e.g., robotic arm 200 of FIG. 2) may be coupled to the plurality of first connection points 308 and an end effector may be coupled to the plurality of second connection points 310. As such, within such examples where the flexure device 300 may be between an end effector and another component of a robotic arm, a force on the end effector may cause a deflection between the inner disk element 302 and the outer ring element 306. The magnitude of the force may be measured by a sensor based on an amount of the deflection.

In other examples, other components of a flexure assembly may couple to the flexure device 300 via the plurality of first connection points 308 and the plurality of second connection points 310. For example, a first adapter component (not shown in FIG. 3) may couple to the plurality of first connection points 308 on the inner disk 302. Similarly, a second adapter component (also not shown in FIG. 3) may couple to the plurality of second connection points 310 on the outer ring 306. The adapter components may include or be part of other housing components of a robotic system. In some examples, for easier installation, access, and maintenance, the plurality of first connection points 308 and the plurality of second connection points 310 may all be accessed from a first direction. In more examples, other components may be coupled to the flexure device 300 via connections access from the first direction. Designing connections to be accessed from the same, first direction, may save time when components of a related flexure assembly need to be fixed, replaced, or otherwise maintained. In some embodiments, the plurality of first connection points 308 may alternate or be symmetrically spaced between the plurality of connecting flexural elements 304. In further embodiments, the plurality of second connection points may be aligned with or axially aligned with the plurality of connecting flexural elements 304.

Within examples, the inner disk 302, the plurality of flexural connecting elements 304, and the outer ring 306 may be injection molded such that the elements together form a single, unibody, injection molded flexural component. Among other possibilities, the inner disk 302, the plurality of flexural connecting elements 304, and the outer ring 306 may be molded plastic. By utilizing advancements in injection molding technologies, the flexure device 300 may include a unibody component including the various elements described herein and also be produced quickly and more efficiently at a lower-cost than other flexure designs.

Figure 4A:
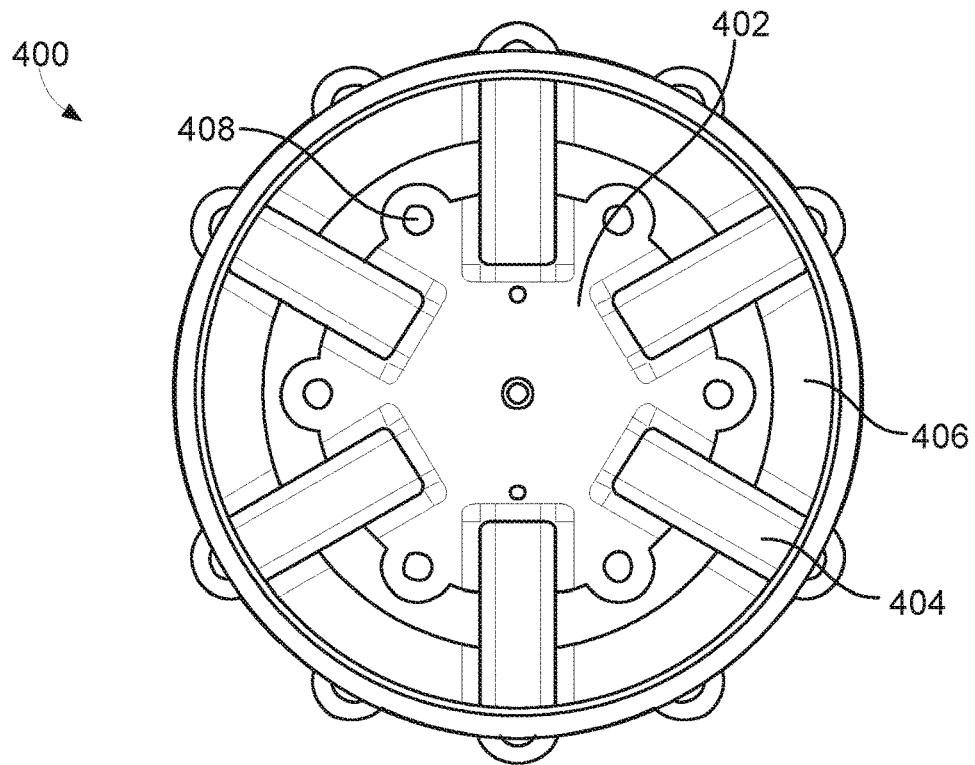
FIG. 4A illustrates a top view of an example unibody flexure device, according to an example embodiment.
Figure 4B:
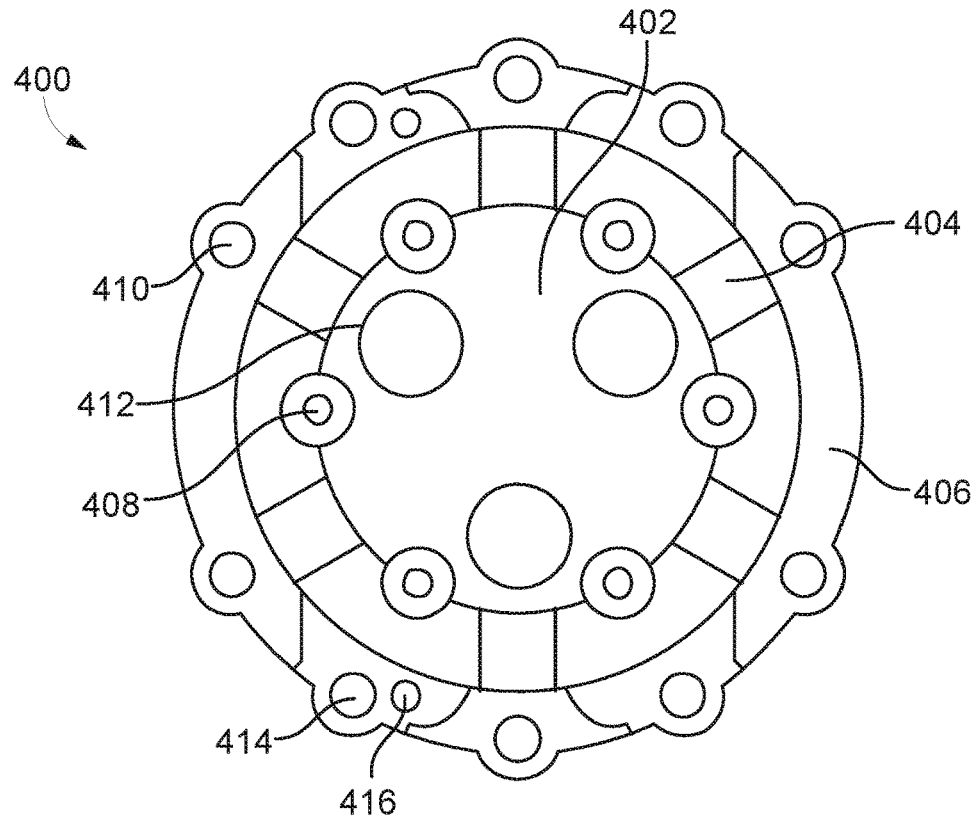
FIG. 4B illustrates a bottom view of an example unibody flexure device, according to an example embodiment

FIG. 4A illustrates a top view of a flexure device 400 and FIG. 4B illustrates a bottom view of the flexure device 400. Components of the flexure device 400 in FIGS. 4A & 4B may take the same or similar form and function in a similar manner as similarly numbered components of the flexure device 300 in FIG. 3. For example, the flexure device 400 includes an inner disk element 402, a plurality of connecting flexural elements 404, and an outer ring element 406. As shown in FIG. 4A, the inner disk 402 includes a plurality of first connection points 408.

The bottom view of the flexure device 400 in FIG. 4B further includes the plurality of first connection points 408 but also includes the plurality of second connection points 410 on the outer ring 406. FIG. 4B further illustrates a plurality of reflective surface areas 412 located on the inner disk 402. Additionally, additional connection points 414 and connection protrusions 416 are located on the outer ring 406. The additional connection points 414 and connection protrusions 416 may be used to couple other components, such as a printed circuit board ("PCB") to the outer ring 406 of the flexure device 400. The reflective surface areas 412 and the additional connection points 414 and connection protrusions 416 may all face the same direction, viewable in the bottom view of FIG. 4B, such that components coupled to the additional connection points and/or connection protrusions 416 may interact or interface. For example, the plurality of reflective surface areas 412 may be configured to reflect light to a sensor located on an additional component, such as a PCB board coupled to the additional connection points 414 and connection protrusions 416.

As depicted in FIG. 4B, the reflective surface areas 412 may be symmetrically spaced out on the inner disk 402. Within examples, a reflective coating may be applied to the reflective surface areas 412 and the reflective surface areas 412 may be concave. While three reflective surface areas 412 are shown, more or less reflective areas may be considered. However, by having at least three reflective surface areas 412, the relative movement of the inner disk 402 may be more accurately determined that having less than three reflective surfaces.

IV. EXAMPLE FLEXURE ASSEMBLIES FOR A FORCE/TORQUE SENSOR

Figure 5:
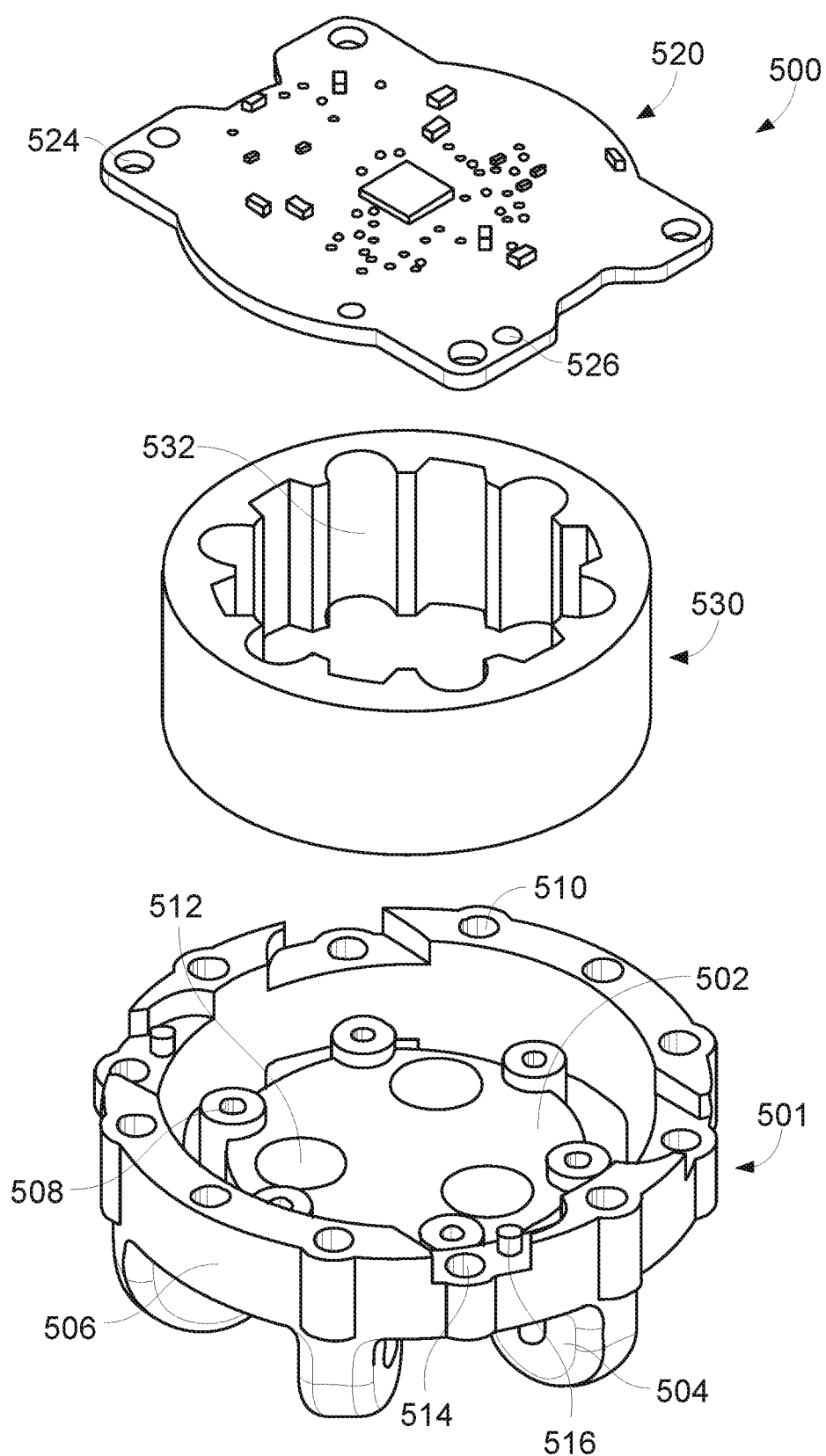
FIG. 5 illustrates separate components of an example flexure assembly, according to an example embodiment.

FIG. 5 illustrates an exploded view of the separate components of a flexure assembly 500. The flexure assembly 500 includes a flexure device 501, a printed circuit board ("PCB") 520, and a seal component 530. The flexure device 501 may be similar to the flexure device 300 and/or the flexure device 400 of FIGS. 3, 4A, and 4B, respectively. For example, the flexure device 501 includes an inner disk element 502, a plurality of flexural elements 504, an outer ring element 506, a plurality of first connection points 508, a plurality of second connection points 510, a plurality of reflective surfaces 512, additional connection points 514, and connection protrusions 516. FIG. 5 further illustrates how the varying components of flexure assembly 500 may relate and join together. The flexure assembly 500 may further include aspects of the robotic system 100 of FIG. 1 and/or the robotic arm 200 of FIG. 2.

Among other components, the PCB 520 includes connection points 524 and protrusion connectors 526. Connectors such as screws, bolts, or other similar features may couple the PCB 520 to the flexure device 501 at the additional connection points 514 that correspond to the connection points 524. Moreover, the connection protrusions 516 of the outer ring 506 may couple and/or align with the protrusion connectors 526 of the PCB 520. As such, the PCB 520 may move with the outer ring 506 or otherwise be subject to a similar relative movement relationship with the inner disk 502.

In the perspective view of FIG. 5, only a top-side of the PCB 520 is visible. On the bottom side, hidden from view, the PCB includes a plurality of light-emitting diodes ("LEDs") and a sensor that are positioned opposite the plurality of reflective surface areas 512 of the inner disk 502. When a load is applied such that the inner disk 502 moves relative to the outer ring 506, characteristics of light being emitted by the LEDs, reflected by the reflective surface areas 512, and collected by the sensor on the PCB, will change, and based on the changes to the light reflected, the sensor is configured to determine at least one component of a load applied on the flexure device 500. Furthermore, the change in the light reflected by the reflective surface areas 512 may be based on one or more deflections of the inner disk 502 relative to the outer ring 506 and PCB 520 when a load is applied on the flexure device 501. In some examples, the combination of the reflective surfaces, the LEDs, and the sensor may comprise a sensor assembly. In further examples, more than one light collecting sensor may be used and located on the PCB board.

FIG. 5 also illustrates the seal component 530. The seal component 530 may comprise an elastic solid material. For example, in some instances, the seal component 530 may include a formed foam seal. Within other examples, the seal component 530 may comprise a laminated stack of at least two die-cut elements. The seal component 530 includes a plurality of cutouts 532 that are shaped to correspond to elements of the flexure device 501. As such, the seal component 530 may slide into a cavity created by the shape of the plurality of connecting flexural components 504. The seal component may therefore be located adjacent to the plurality of connecting flexural elements 504 such that the seal component 530 is between the inner disk 502 and the outer ring 506. Moreover, the seal component 530 may be adjacent to the PCB 520 such that the cavity between components is sealed on all sides. The seal component 530 may block out dust, ambient light, and other particles from interfering and/or coming between the sensor and the reflective surface areas 512.

Figure 6:
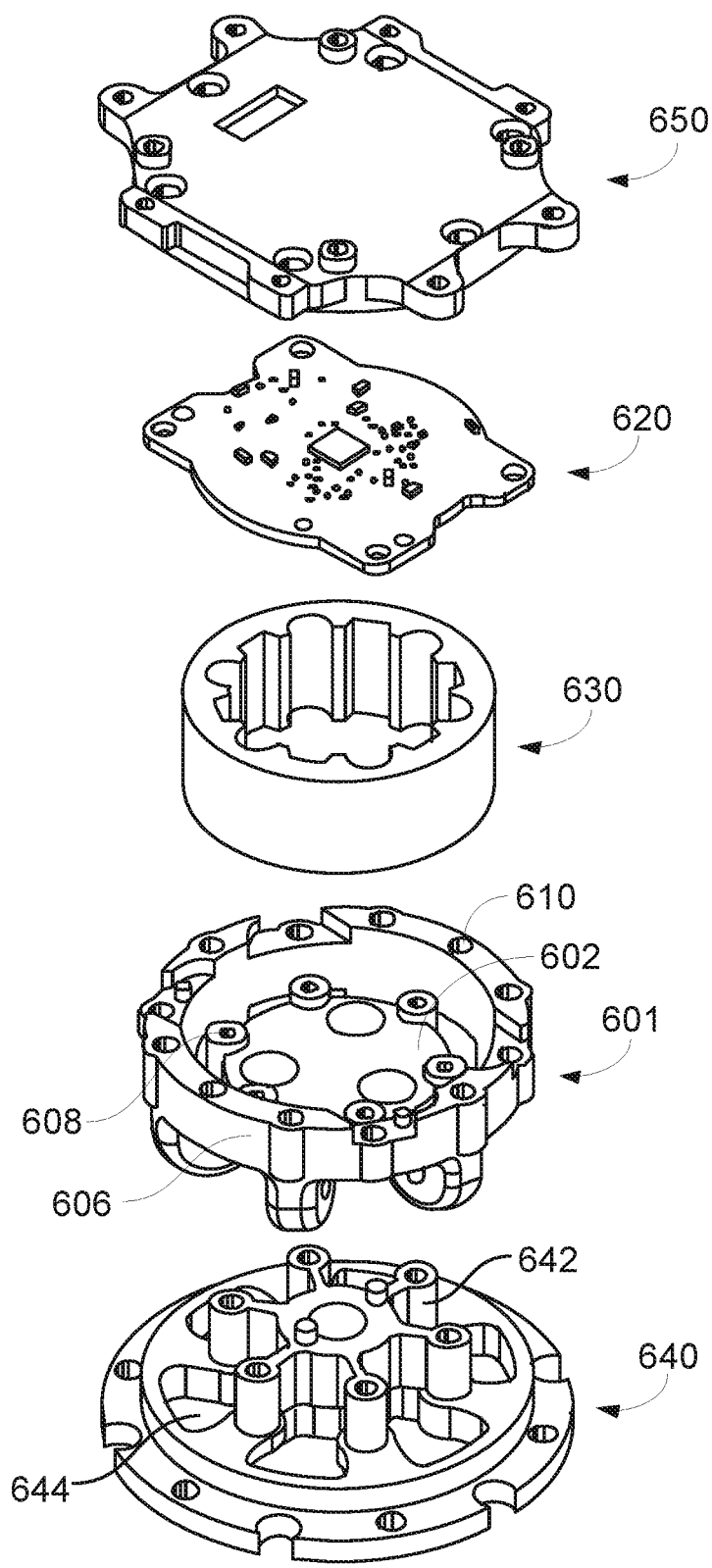
FIG. 6 illustrates separate components of another example flexure assembly, according to an example embodiment.

FIG. 6 illustrates an exploded view of the separate components of a flexure assembly 600. The flexure assembly 600 includes a flexure device 601, a PCB 620, a seal component 630, a first adapter component 640, and a second adapter component 650. Components of the flexure assembly 600 may take the same or similar form and function in a similar manner as similarly numbered components of the flexure device 500 in FIG. 5. Moreover, the flexure device 501 may be similar to the flexure device 300, the flexure device 400, and/or the flexure device 501 of FIGS. 3, 4A, 4B, and 5 respectively. Similarly, the PCB 620 may be similar to the PCB 520 and the seal component 630 may be similar to the seal component 530 of FIG. 5.

Building on the components shown in FIG. 5, FIG. 6 further illustrates the first adapter component 640 that includes a plurality of inner disk connection points 642 and flexural element cavities 644. The plurality of inner disk connection points 642 may correspond to a first plurality of connection points 608 of the inner disk 602. Similar corresponding connection points may be located on the second adapter component 650 that couples to the outer ring 606 of the flexure device 601 (e.g., coupling the second housing 650 to the plurality of second connection points 610).

As such the plurality of first connection points 608 and the corresponding inner disk connection points 642 may be the points of interface between the inner disk 602 and the first adapter component 640. In at least one example, a load applied on at least one of the first adapter component 640 or the second adapter component 650 may be transferred to the inner disk 602 and/or the outer ring 606, respectively, at the plurality of first connection points 608 or the plurality of second connection points 610, respectively.

Within a robotic system, the flexure device 601 may couple or interface directly with components of the robotic system such that loads may be transferred directly to the flexure device 601. In other example robotic systems, adapter components may connect the flexure device 601 to components of the robotic system. For example, in one embodiment, the first adapter component 640 may be coupled to an end effector, such as end effector 208, and the second adapter component 650 may be coupled to a joint, such as joint 204C, of FIG. 2. In such an embodiment, wherein the first adapter component 640 and the second adapter component 650 are coupled to other components of a robotic system, a force(s) or load(s) applied on the robotic system may be transferred to at least one of the first adapter component 640 and/or the second adapter component 650 which may then transfer the load to the flexure device 601. In some examples, the first adapter component 640 and the second adapter component 650 may also include features that may be used as hard stops that may prevent the flexure device 601 from becoming damaged.

The PCB 620 and flexure device 601 may include one or more parts that may be configured to measure the deflection between the inner disk 602 and the outer ring 606 when a load may be applied on the flexure assembly 600. The deflection may include the relative displacement and rotation of the inner disk 602 relative to the outer ring 606. While optical sensing has been described in some detail herein, the PCB 620 and flexure device 601 may utilize any number of sensing techniques or sensing elements in order to determine the relative deflection.

V. EXAMPLE METHODS OF MANUFACTURE AND USE OF A FLEXURE ASSEMBLY FOR A FORCE/TORQUE SENSOR

Figure 7:
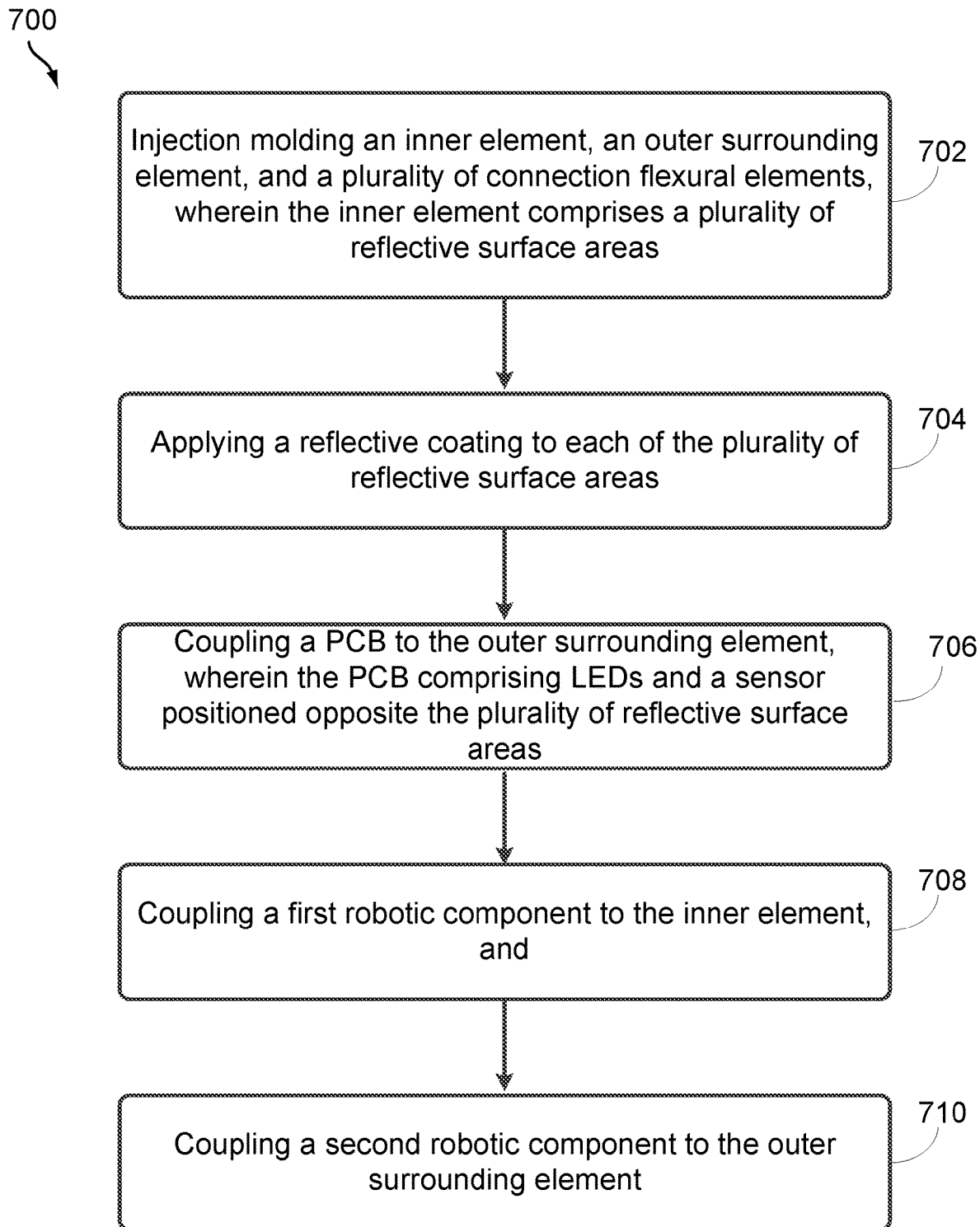
FIG. 7 is a block diagram of an example method, according to an example embodiment.

FIG. 7 is a flowchart of an example method for assembling a flexure assembly for a force/torque sensor in accordance with at least some embodiments described herein. In one example implementation, method 700 describes injection molding elements of a flexure device, and then assembling the flexure device with other flexure assembly components.

Illustrative methods, such as method 700, may be carried out in whole or in part by a component(s) in a robotic system, such as one or more of the components in the robotic system 100 illustrated in FIG. 1, or by a component(s) in robotic arm 200 as illustrated in FIG. 2. It should be understood that example methods, such as method 700, might be carried out by entities, or combinations of entities (i.e., by other computing devices, robotic devices, and/or combinations thereof), without departing from the scope of the invention.

For example, functions of the method 700 may be fully performed by a computing device (or components of a computing device such as one or more processors or controllers), or may be distributed across multiple components of the computing device, across multiple computing devices, a control system and/or across a server. In some examples, the computing device may receive information from sensors of the computing device, or may receive information from other computing devices that collect the information. As with other examples, a computing device, a server, or a robotic system may perform the method 700.

As shown by block 702, the method 700 includes injection molding an inner element, an outer surrounding element, and a plurality of connecting flexural elements. The inner element, the outer surrounding element, and the plurality of connecting flexural elements may be similar to other examples of elements described within this application, particularly regarding FIGS. 3-6.

As shown by block 704, the method 700 further includes applying a reflective coating to each of a plurality of reflective surface areas of the inner element. The reflective coating may be configured to reflect a specific wavelength of light emitted from LEDs.

As shown by block 706, a PCB that includes at least one sensor and LEDs is coupled to the outer surrounding element of the flexure device such that the outer surrounding element and PCB move together relative to the inner element.

As provided by blocks 708 and 710, the method 700 further includes coupling a first robotic component of a robotic system to the inner element and coupling a second robotic component to the outer surrounding component. In some examples, the first robotic component may include a first adapter component and similarly the second robotic component may include a second adapter component. In other examples, the first robotic component may include a gripper or end effector of the robotic system and the second robotic component may include another component of a robotic arm such as a joint or other appendage. In yet other examples, the robotic components may include appendages such as robotic arms, legs, and/or hands, among others.

The method 700 may also include receiving, from at least one sensor, sensor data indicating one or more deflections between the inner element and the outer surrounding element resulting from an applied load on at least one of the first robotic component or the second robotic component.

In further examples, the method 700 may include determining one or more output parameters based on one or more deflections of the inner element relative to the outer surrounding element when a load is applied to at least one of the first robotic component or the second robotic component. One or more output parameters based on one or more deflections may include at least one force component of an applied load. Additionally, the one or more output parameters may include a position or orientation of an end effector or appendage of a robotic system.

Within examples, the at least one sensor may measure one or more deflections of the inner element relative to the outer surrounding element when a load is applied. The at least one sensor may then determine at least one force component of the applied load based on the measured deflections. Within other examples, the at least one sensor may determine at least one force component of the applied load based on raw signals transmitted from sensing elements of the at least one sensor. The raw signals transmitted from sensing elements of the at least one sensor may be dependent on the deflection(s) between the inner element relative to the outer surrounding element.

Determining one or more output parameters may include transmitting raw output signals, such as voltage or frequency, from sensing elements of the at least one output sensor to a computing device and/or control system. The computing device may be within the at least one sensor, or may be somewhere else within a robotic system, such as the robotic system 100 in FIG. 1. The computing device may then determine at least one force component of the applied load, or may determine the orientation of the end effector of a robotic arm, such as end effector 208 of FIG. 2, based on the raw signals from the sensing elements. Further, the deflections caused by the load applied to the flexure assembly may further include the displacement and/or rotation of the inner element relative to the outer surrounding element.

The method 700 may further include determining at least one component of the forces and moments of the applied load based on the one or more deflections measured. In one example, the determining of at least one component of the forces and moments may be further based on the stiffness of the connecting flexural elements. In one aspect, the forces and moments may include at least axial and/or radial forces and moments. In one embodiment, the method 700 may further include altering the operation of at least one of an end effector or a robot arm, based on at least one component of the determined the forces and moments.

Altering the operation of at least one of the end effector or the robot arm may include adjusting an orientation of at least one of the end effector or the robot arm. In other examples, altering the operation of at least one of the end effector or the robot arm may include shutting the robot system off, holding the robot in a static position, or putting the robotic system into a safety mode when a high force is detected. In yet other examples, current applied to actuators or motors of the robotic system (such as actuator(s) 114 of FIG. 1) may be adjusted to reduce the forces applied to the flexure assembly. The end effector may be similar to end effector 208 of FIG. 2, and may be coupled to a first adapter component such as the first adapter component 640 of FIG. 6, among other possibilities. Further, the robot arm may be coupled to a second adapter component, such as the second adapter component 650 of FIG. 6. In other examples, the end effector may be directly coupled to the flexure assembly or device without any adapter components.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of a method described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

VI. CONCLUSION

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

We claim:

1. A device, comprising:
an inner element comprising a plurality of reflective surface areas, wherein the plurality of reflective surface areas are configured to reflect light to a sensor;
an outer surrounding element, wherein the outer surrounding element surrounds the inner element; and
a plurality of connecting flexural elements coupled between the inner element and the outer surrounding element, wherein the plurality of connecting flexural elements to allow the inner element to move relative to the outer surrounding element.

2. The device of claim 1, wherein the inner element comprises a disk element, and further wherein the outer surrounding element comprises a ring element.

3. The device of claim 1, further comprising:
the sensor, wherein the sensor is configured to determine at least one component of a load applied on the device based on a change in the light reflected by the reflective surface areas of the inner element.

4. The device of claim 3, wherein the change in the light reflected by the reflective surface areas is based on one or more deflections of the inner element relative to the outer surrounding element when the load is applied.

5. The device of claim 3, further comprising a printed circuit board ("PCB") coupled to the outer surrounding element and configured to move with the outer surrounding element relative to the inner element, wherein the sensor is located on the PCB opposite the plurality of reflective surface areas, and further wherein the PCB comprises a plurality of light-emitting diodes ("LEDs").

6. The device of claim 1, wherein each of the plurality of connecting flexural elements comprise an arch flexural element.

7. The device of claim 1, wherein the plurality of connecting flexural elements comprises six connecting flexural elements spaced symmetrically about the inner element and the outer surrounding element.

8. The device of claim 1, wherein the plurality of connecting flexural elements are configured to resist relative movement between the inner element and the outer surrounding element.

9. The device of claim 1, wherein the inner element, the outer surrounding element, and the plurality of connecting flexural elements form a single injection molded flexural component.

10. The device of claim 1, wherein the outer surrounding element is coaxial with the inner element.

11. The device of claim 1, wherein the outer surrounding element comprises at least a portion of each of the plurality of connecting flexural elements.

12. The device of claim 1, further comprising:
a first adapter component coupled to a plurality of first connection points located on the inner element; and
a second adapter component coupled to a plurality of second connection points on the outer surrounding element.

13. The device of claim 12, wherein the plurality of first connection points of the inner element and the plurality of second connections points of the outer surrounding element are configured to be accessed from a first direction.

14. The device of claim 1, wherein an end effector of a robotic arm is coupled to a plurality of first connection points located on the inner element, and further wherein another component of the robotic arm is coupled to a plurality of second connection points on the outer surrounding element.

15. The device of claim 1 further comprising:
a seal component adjacent to the plurality of connecting flexural elements between the inner element and the outer surrounding element.

16. The device of claim 15, wherein the seal component comprises an elastic solid material.

17. A robotic system comprising:
an inner element comprising a plurality of reflective surface areas, wherein the plurality of reflective surface areas are configured to reflect light to a sensor;
an outer surrounding element, wherein the outer surrounding element surrounds the inner element;
a plurality of connecting flexural elements coupled between the inner element and the outer surrounding element, wherein the plurality of connecting flexural elements to allow the inner element to move relative to the outer surrounding element; and
a control system configured to:
receive reflected light data from the sensor;
based on the reflected light data, determine a deflection of the inner element relative to the outer surrounding element when a load is applied on at least one of the inner element or the outer surrounding element of the robotic system; and
based on the deflection determined, determine one or more output parameters of the applied load on the robotic system.

18. The device of claim 1, wherein each connecting flexural element allows the inner element to move in six degrees-of-freedom relative to the outer surrounding element.

19. The device of claim 1, wherein the inner element, the outer surrounding element, and the plurality of connecting flexural elements form a single unibody flexure device.

20. A device, comprising:
an inner element comprising a plurality of reflective surface areas, wherein the plurality of reflective surface areas are configured to reflect light to a sensor;
an outer surrounding element, wherein the outer surrounding element surrounds the inner element; and
a plurality of connecting arch flexural elements coupled between the inner element and the outer surrounding element, wherein the plurality of connecting arch flexural elements allow the inner element to move relative to the outer surrounding element.

* * * * *